(12) United States Patent
Yamada et al.

(10) Patent No.: US 10,884,301 B2
(45) Date of Patent: *Jan. 5, 2021

(54) DISPLAY DEVICE

(71) Applicant: Japan Display Inc., Minato-ku (JP)

(72) Inventors: Kazuyuki Yamada, Minato-ku (JP);
Kota Uogishi, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/831,057

(22) Filed: Mar. 26, 2020

(65) Prior Publication Data

US 2020/0225524 A1 Jul. 16, 2020

Related U.S. Application Data

(63) Continuation of application No. 16/373,147, filed on Apr. 2, 2019, now Pat. No. 10,634,965.

(30) Foreign Application Priority Data

Apr. 5, 2018 (JP) .................................. 2018-072880

(51) Int. Cl.
*G02F 1/1345* (2006.01)
*G02F 1/1335* (2006.01)
*G02F 1/1368* (2006.01)

(52) U.S. Cl.
CPC ........ *G02F 1/13452* (2013.01); *G02F 1/1368* (2013.01); *G02F 1/133528* (2013.01); *G02F 2202/22* (2013.01); *G02F 2202/28* (2013.01)

(58) Field of Classification Search
None
See application file for complete search history.

(56) References Cited

U.S. PATENT DOCUMENTS

| 10,634,965 B2 * | 4/2020 | Yamada .............. G02F 1/13452 |
| 2013/0271958 A1 | 10/2013 | Jang |
| 2015/0002779 A1 | 1/2015 | Joten |

FOREIGN PATENT DOCUMENTS

| JP | 2013-218178 | 10/2013 |
| JP | 2015-11109 | 1/2015 |
| JP | 2015-11121 | 1/2015 |

* cited by examiner

*Primary Examiner* — James A Dudek
(74) *Attorney, Agent, or Firm* — Oblon, McClelland, Maier & Neustadt, L.L.P.

(57) ABSTRACT

To address static electricity on a flat panel display device and to implement a narrow frame of the flat panel display device. A liquid crystal display device (20) includes a counter substrate (22), a TFT substrate (21), and an upper polarizer (23). The TFT substrate (21) includes a terminal portion (30) projecting more outward than the edge of a counter substrate (22), and a ground pad (32) disposed on a surface of the terminal portion (30), the surface being on the side closer to the counter substrate (22). The upper polarizer (23) includes a pad facing portion (33) that overlaps the ground pad (32) at a position more outward than the edge of the counter substrate (22). The liquid crystal display device (20) further includes an electrically conductive member (34) filled in the gap between the ground pad (32) and the pad facing portion (33).

5 Claims, 7 Drawing Sheets

DISPLAY DEVICE

CROSS-REFERENCE TO RELATED APPLICATION

The present application is a continuation of U.S. application Ser. No. 16/373,147, filed Apr. 2, 2019, and which claims priority from Japanese application JP2018-72880 filed on Apr. 5, 2018, the content of each of which is hereby incorporated by reference into this application.

BACKGROUND OF THE INVENTION

1. Field of the Invention

The present invention relates to display devices.

2. Description of the Related Art

Flat panel displays, such as liquid crystal display devices or organic electroluminescence (EL) display devices, have a display panel including laminated substrates, for example, having a thin film transistor (TFT) thereon. In some cases, the operation of the display device may be affected by static electricity charged on the display panel.

For example, a liquid crystal display device has liquid crystal between a substrate (hereinafter referred to as a TFT substrate) having a TFT thereon, for example, and another substrate (hereinafter referred to as a counter substrate) disposed on the side closer to the image display surface and having a color filter thereon, for example. Such a liquid crystal display device controls the orientation of the liquid crystal with an electric field to thereby form an image. A display device such as a touch panel having a touch sensing function incorporated on the counter substrate side may have charges accumulated in the counter substrate. The accumulated charges may cause unintentional application of an electric field to the liquid crystal, which possibly leads to display unevenness.

Figure 7:
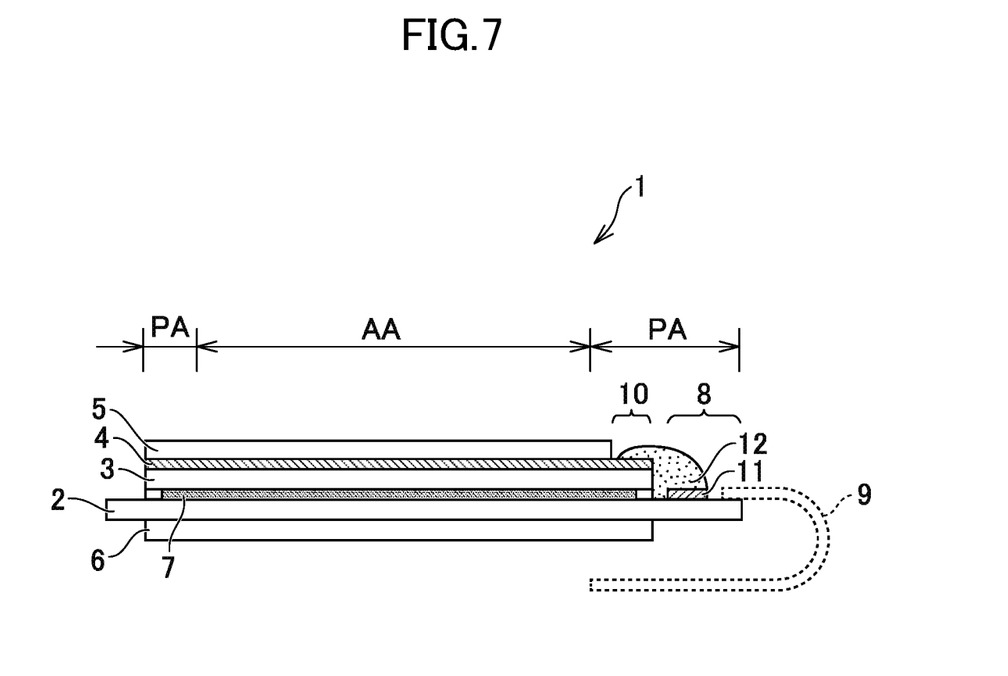
FIG. 7 is a vertical cross-sectional view of a conventional liquid crystal display device.

To address the above, conventionally, an electrically conductive layer is formed on the outside surface of the counter substrate to prevent electrification. FIG. 7 is a vertical cross-sectional view of a conventional liquid crystal display panel 1. In FIG. 7, a counter substrate 3 is disposed on the TFT substrate 2. An electrically conductive layer 4 is formed on the upper surface of the counter substrate 3. An upper polarizer 5 is disposed on the electrically conductive layer 4. A lower polarizer 6 is disposed under the TFT substrate 2. Liquid crystal 7 is held between the TFT substrate 2 and the counter substrate 3.

The liquid crystal display panel 1 has an active area AA, or an image display area, and a peripheral frame area PA, or an area outside the active area AA. The substrates, the polarizers, or the like need to be disposed over the entire active area AA. Basically, the substrates or the like are designed so as to have a larger dimension as compared with the dimension of the active area AA by including a margin in consideration of their tolerance. A terminal portion 8 is provided in the peripheral frame area of the TFT substrate 2. The terminal portion 8 projects more than the counter substrate 3, and has a terminal formed on the upper surface of the terminal portion 8 for connection to a flexible substrate 9.

The counter substrate 3 has an extension portion 10 extending more outward than the upper polarizer 5 and being not opposed to the upper polarizer 5. The electrically conductive layer 4 on the upper surface of the extension portion 10 is electrically connected to a ground pad 11 via an electrically conducive paste 12, in which the ground pad 11 is disposed on the upper surface of the terminal portion 8 of the TFT substrate 2, the terminal portion 8 being adjacent to the extension portion 10. The ground pad is grounded, for example, via a flexible substrate 9 whereby the electrically conductive layer 4 is also grounded.

SUMMARY OF THE INVENTION

Provision of the extension portion 10 to the counter substrate 3 so that the electrically conductive layer 4 is exposed at a position where the electrically conductive layer 4 is connected to the ground pad on the surface of the TFT substrate 2 leads to a problem of a large peripheral frame area PA.

The present invention aims to implement a narrower frame of a display device.

A display device according to the present invention includes a first substrate, a second substrate, and a polarizer, the second substrate and the polarizer together sandwiching the first substrate, wherein the second substrate includes a terminal portion and a ground pad, the terminal portion projecting more outward than the edge of the first substrate, the ground pad being disposed on the surface of the terminal portion, the surface being on the side closer to the first substrate. The polarizer includes a pad facing portion that overlaps the ground pad at a position more outward than the edge of the first substrate. The display device further includes an electrically conductive member in the gap between the ground pad and the pad facing portion.

DETAILED DESCRIPTION OF THE INVENTION

Embodiments of the present invention (hereinafter referred to as embodiments) will now be described based on the drawings.

The disclosure is merely an example, and, needless to say, any modifications easily conceivable by a person killed in the art while retaining the gist of the present invention are included in the range of the present invention. For more clarification of the descriptions, the drawings may illustrate widths, thicknesses, shapes and so forth of the respective members schematically as compared with actual aspects in some cases. These are merely examples, and not intended to limit interpretation of the present invention. In the specification and respective drawings, members similar to those described earlier in connection with drawings referred to earlier are given the same reference numerals, and detailed description thereof may be omitted.

First Embodiment

Figure 1:
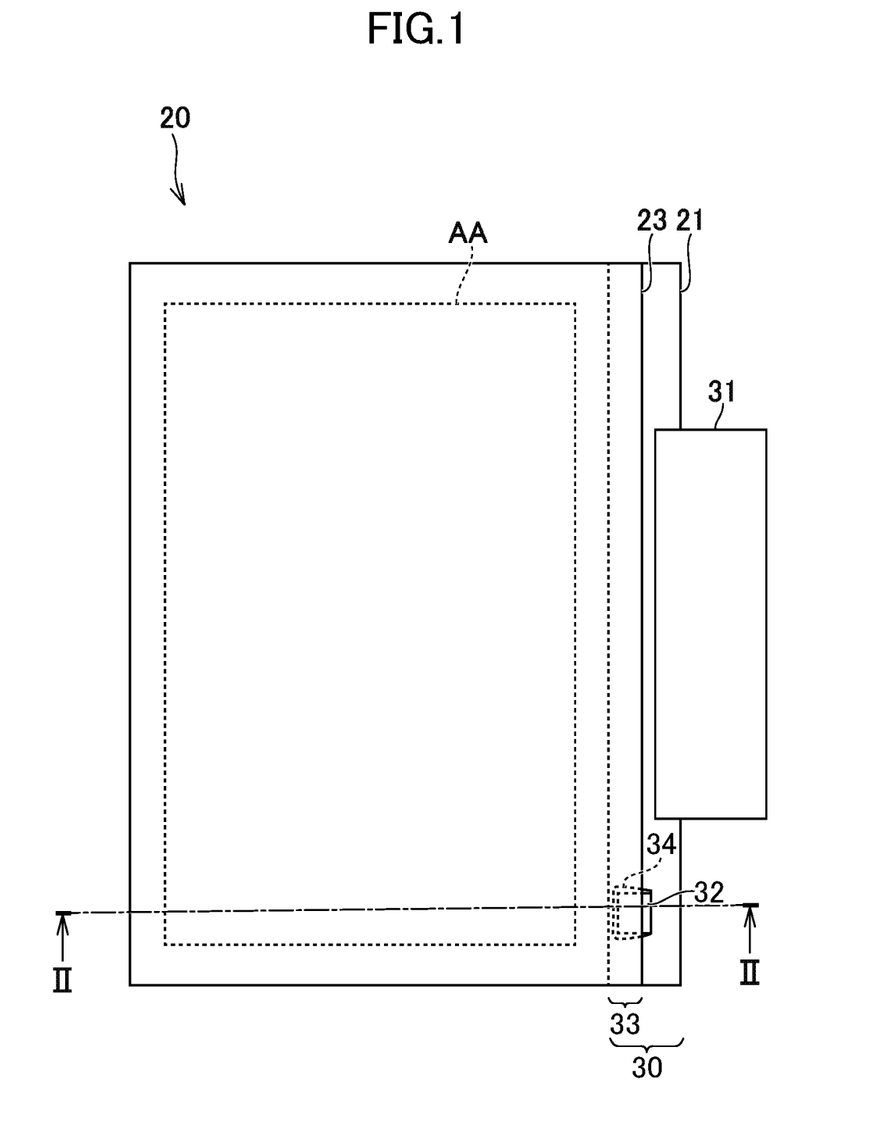
FIG. 1 is a schematic plan view of a liquid crystal display device according to a first embodiment of the present invention.
Figure 2:
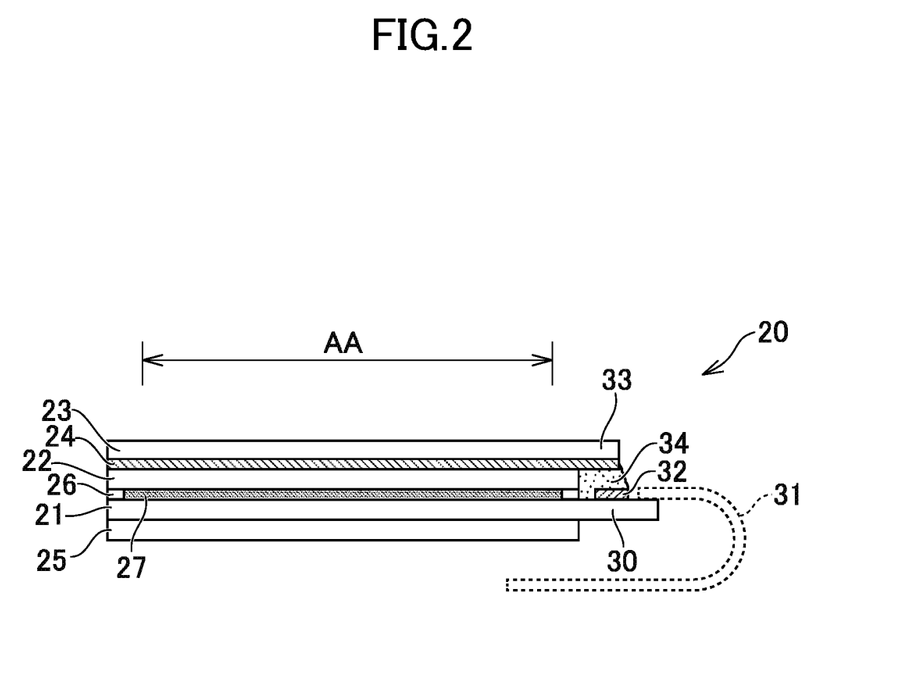
FIG. 2 is a schematic vertical cross-sectional view of a liquid crystal display device along the line II-II in FIG. 1.

FIG. 1 is a schematic plan view of a liquid crystal display device 20 according to a first embodiment. FIG. 2 is a schematic vertical cross-sectional view of the liquid crystal display device 20 along the line II-II in FIG. 1. FIG. 1 and FIG. 2 illustrate, in particular, a schematic structure of a display panel of the liquid crystal display device 20.

The display panel of the liquid crystal display device 20 includes a TFT substrate 21 (a second substrate), a counter substrate 22 (a first substrate), and an upper polarizer 23. In FIG. 2, the upper surface of the liquid crystal display device 20 corresponds to the image display surface side. The counter substrate 22 is disposed over the TFT substrate 21 so as to be opposed to the TFT substrate 21. The upper polarizer 23 is disposed over the counter substrate 22. That is, the TFT substrate 21 and the upper polarizer 23 are disposed so as to be opposed to each other with the counter substrate 22 in-between.

On the surface of the upper polarizer 23 on the side closer to the counter substrate 22, an electrically conductive adhesive layer 24 is formed. That is, the upper polarizer 23 is attached onto the counter substrate 22 with the electrically conductive adhesive layer 24. Further, a lower polarizer 25 can be attached on the lower side of the TFT substrate 21. A gap is formed by a spacer (not illustrated) between the TFT substrate 21 and the counter substrate 22. The TFT substrate 21 is attached to the counter substrate 22 with a seal member 26. A liquid crystal layer 27 is encapsulated inside the seal member 26.

FIG. 2 is a schematic view, as described above, and does not illustrate, for example, a cover glass that can be disposed on the front surface, or the upper surface, of the display panel and a backlight for emitting light to enter the back surface of the TFT substrate 21.

For example, an TFT, an electrode, and a wire, not illustrated, are formed on the TFT substrate 21. For example, the liquid crystal display panel in this embodiment employs a transverse electric field drive mode in which electrodes for driving the liquid crystal are disposed only on the TFT substrate 21 so that a voltage is applied to the liquid crystal in the horizontal direction. An example of the transverse electric field drive mode includes In Plane Switching (IPS) mode. Meanwhile, the counter substrate 22 is, for example, a substrate having a black matrix, a color filter, or the like. The TFT substrate 21 and the counter substrate 22 can be made, for example, using a glass substrate or a flexible resin substrate.

The TFT substrate 21, the counter substrate 22, the upper polarizer 23, and the lower polarizer 25 each have a dimension and a shape that cover the active area AA. In this embodiment, since the active area AA is rectangular, the TFT substrate 21, the counter substrate 22, the upper polarizer 23, and the lower polarizer 25 are accordingly illustrated schematically rectangular.

The TFT substrate 21 has a terminal portion 30 formed along one edge of its rectangular shape. The terminal portion 30 projects more outward than the edge of the counter substrate 22. That is, the terminal portion 30 projects horizontally outward (rightward in FIG. 1 and FIG. 2) from the edge of the counter substrate 22. A connection terminal for connection to an outside circuit is disposed on the upper surface of the terminal portion 30. In this embodiment, a group of connection terminals (not illustrated) are aligned along an edge of the terminal portion 30. Flexible printed circuit board (FPC) 31 is connected to the connection terminals. It is possible to mount a device such as an integrated circuit (IC) on the FPC 31 with the Chip On Film (COF) technique.

Further, the TFT substrate 21 has a ground pad 32 on the upper surface of the terminal portion 30. The ground pad 32 is set to the ground potential (GND). For example, the ground pad 32 is connected to a power source for supplying GND via the FPC 31 and a wire formed on the surface of the TFT substrate 21.

Note that in the area of the TFT substrate 21 between the active area AA and the connection terminals along the edge of the terminal portion 30, a wire or the like (not illustrated) is disposed. Thus, it is possible to dispose the ground pad 32, for example, outside the area with the wire formed. Specifically, as to the direction (the vertical direction in FIG. 1) of one edge of the TFT substrate 21, along which edge the terminal portion 30 is formed, the ground pad 32 can be disposed at a position more outward than the portion to which the FPC 31 is connected. Note that, although the ground pad 32 is positioned at a lower side than the FPC 31 in the example in FIG. 1, the ground pad 32 can be positioned at an upper side than the FPC 31. Alternatively, the ground pad 32 can be disposed at a plurality of positions, such as on the both sides of the FPC 31.

Meanwhile, the upper polarizer 23 has a pad facing portion 33 as its end portion projecting more outward than the edge of the counter substrate 22. The pad facing portion 33 is opposed to the ground pad 32, and overlaps the ground pad 32 in a plan view. In the example in FIG. 1, of the end portions of the upper polarizer 23, one whole edge of an end portion of the upper polarizer 23 on the same side as the terminal portion 30 of the TFT substrate 21 projects to the outside. The projecting portion includes the pad facing portion 33. It is sufficient that the ground pad 32 and the pad facing portion 33 partially overlap each other in a plan view. Alternatively, the ground pad 32 may be positioned diagonally below, rather than directly below, the pad facing portion 33. For example, the ground pad 32 does not always have an overlap with the pad facing portion 33 in a plan view.

Still alternatively, instead of one whole edge of the upper polarizer 23 projecting uniformly, only a part of one edge of the upper polarizer 23 may project horizontally to thereby constitute the pad facing portion 33, similar to a pad facing portion 33b illustrated in FIG. 3 for a second embodiment to be described later. For example, forming the pad facing portion 33 as such when the ground pad 32 and the connection terminals for connection to the FPC 31 are disposed with their positions in the horizontal direction in FIG. 1 aligned, in other words, disposed so as to be aligned vertically in FIG. 1 along one edge of the TFT substrate 21 enables provision of the pad facing portion 33 while preventing the upper polarizer 23 from projecting above the connection terminals.

The electrically conductive adhesive layer 24 is an adhesive member for adhering the upper polarizer 23 to the counter substrate 22. The electrically conductive adhesive layer 24 has electric conductivity. Basically, the electrically conductive adhesive layer 24 is disposed over the entire surface of the active area AA and continues from the active area AA to the pad facing portion 33. That is, on the surface of the pad facing portion 33, the surface facing the TFT substrate 21, the electrically conductive adhesive layer 24 is present as an electrically conductive layer continuing to the active area AA. The electrically conductive adhesive layer 24, which overlaps the active area AA, is made of transparent material. For example, material having a sheet resistance of, for example, $1\times10^8$ to $1\times10^{11}\Omega/\square$, can be used to form the electrically conductive adhesive layer 24.

The counter substrate 22 is not present between the ground pad 32 and the pad facing portion 33, and a gap is formed instead. In the gap between the ground pad 32 and the pad facing portion 33, an electrically conductive paste is filled as the electrically conductive member 34. Injection and filling of the electrically conductive paste into the gap is achieved using a known technique, such as a dispenser method for ejecting coating material from a dispenser nozzle or an inkjet method for ejecting coating material from an inkjet head. Electrically conductive paste is, for example, an electrically conductive material containing a resin and a filler, such as silver particles, dispersed in the resin to form conductive paths for charges. Such electrically conductive material is cured through heating or drying.

The electrically conductive member 34 is in contact with the ground pad 32 and also with the electrically conductive adhesive layer 24 on the surface of the pad facing portion 33. Hence, the electrically conductive adhesive layer 24, which is disposed also in the active area AA, is electrically connected to the ground pad 32, whereby the potential of the electrically conductive adhesive layer 24 is set to GND.

In a liquid crystal display panel of the IPS mode, the absence of an electrically conductive layer, such as an electrode, on the counter substrate 22 results in undesired accumulation of charges in the counter substrate 22. This may likely cause display unevenness described above. Regarding this point, the liquid crystal display device 20 in this embodiment has the electrically conductive adhesive layer 24 as an electrically conductive layer disposed between the counter substrate 22 and the upper polarizer 23 of the liquid crystal display panel, and the electrically conductive adhesive layer 24 is connected to the ground pad 32 via the electrically conductive member 34 whereby the potential of the electrically conductive adhesive layer 24 is set to GND, as described above. This structure makes it less likely for static electricity to be accumulated in the counter substrate 22, thus preventing occurrence of display unevenness.

In the above-described structure in FIG. 7, the electrically conductive layer 4 on the upper surface of the counter substrate, which extends outward from the upper polarizer, is horizontally bridged to the ground pad 11 of the TFT substrate, which is positioned more horizontally outward than the electrically conductive layer 4, with the electrically conductive paste 12. On the contrary, in the liquid crystal display device 20 in this embodiment, as for the positional relationship in the horizontal direction, the pad facing portion 33 of the upper polarizer 23 overlaps the ground pad 32 of the TFT substrate 21, and the electrically conductive layer on the back surface (the surface closer to the TFT substrate) of the pad facing portion 33 is vertically bridged to the ground pad 32 with the electrically conductive paste. This structure of the liquid crystal display device 20 in this embodiment, including the ground pad 32 disposed on one edge of the TFT substrate 21 on the side closer to the FPC 31 enables reduction in the dimension of the peripheral frame area along the one edge, thus contributing to a smaller frame.

Second Embodiment

Figure 3:
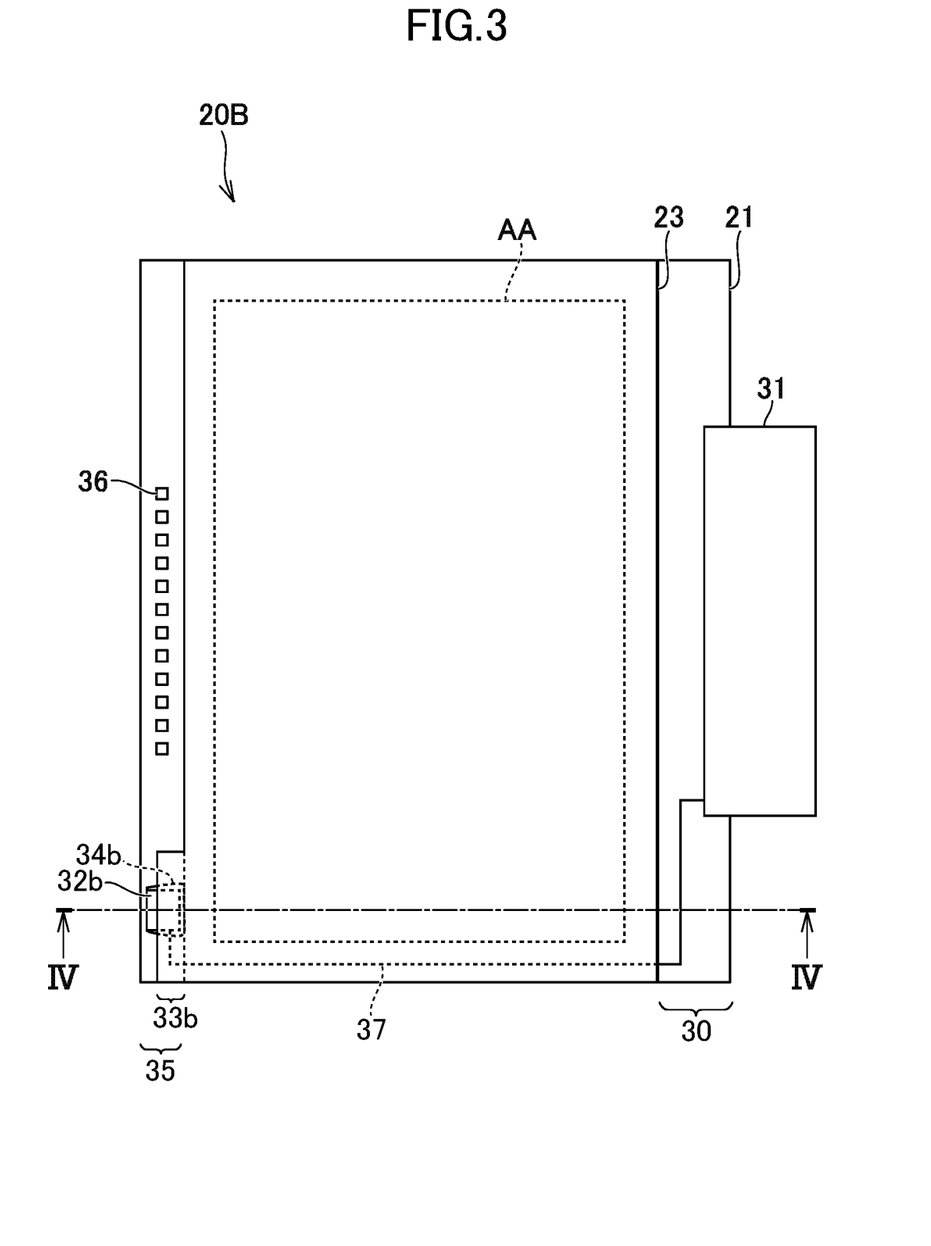
FIG. 3 is a schematic plan view of a liquid crystal display device according to a second embodiment of the present invention.
Figure 4:
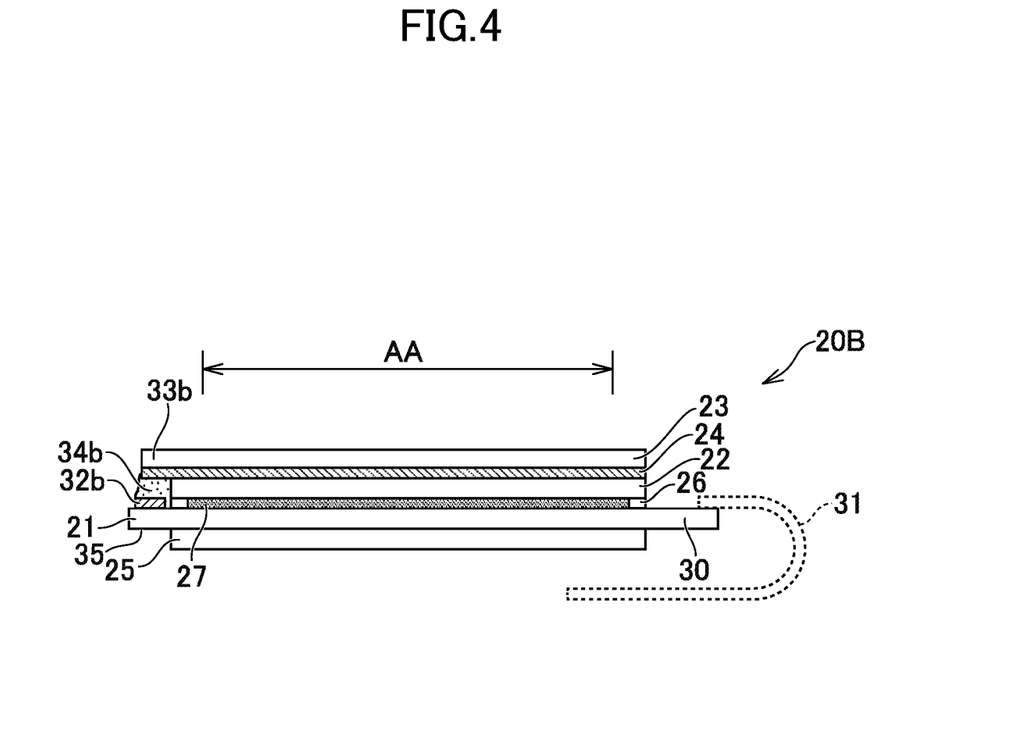
FIG. 4 is a schematic vertical cross-sectional view of a liquid crystal display device along the line IV-IV in FIG. 3.

FIG. 3 is a schematic plan view of a liquid crystal display device 20B according to a second embodiment. FIG. 4 is a schematic vertical cross-sectional view of the liquid crystal display device 20B along the line IV-IV in FIG. 3. FIG. 3 and FIG. 4 respectively correspond to FIG. 1 and FIG. 2 for the first embodiment, in particular, illustrating a schematic structure of the display panel of the liquid crystal display device 20B.

The display panel of the liquid crystal display device 20B differs from that of the liquid crystal display device 20 in the first embodiment in that the TFT substrate 21 of the former display panel has a terminal portion 35 that is formed along the edge of its rectangular shape on the opposite side from the FPC 31 so as to project horizontally more than the counter substrate 22, and in that a ground pad 32b in this embodiment, corresponding to the ground pad 32 in the first embodiment, is disposed not on the terminal portion 30 (a second terminal portion) connected to the FPC 31, but on the terminal portion 35 (a first terminal portion) on the opposite side.

A test pattern 36 is disposed as a terminal on the upper surface of the terminal portion 35. A test pattern 36 is an electrode pad where a probe is to stand in a test of display operation of the liquid crystal display device 20. To enable tests with the probe, the terminal portion 35 projects more outward than the counter substrate 22 and the upper polarizer 23, for example.

The potential of the ground pad 32b is set to GND. For example, the ground pad 32b is connected to a power source for supplying GND via the FPC 31 and a wire formed on the surface of the TFT substrate 21. For example, a wire 37 can be disposed in the peripheral frame area positioned on a lower side (or on an upper side) than the active area AA in FIG. 3 to connect the ground pad 32b and the FPC 31.

The ground pad 32b can be disposed, for example, outside the area with the test pattern 36 on the terminal portion 35. Specifically, as to the direction (the vertical direction in FIG. 3) of one edge of the TFT substrate 21, along which the terminal portion 35 is formed, the ground pad 32b can be disposed at a position more outward than a position where the test pattern 36 is disposed. Although the ground pad 32b is positioned at a lower side than the test pattern 36 in the example in FIG. 3, the ground pad 32b can be positioned at an upper side than the test pattern 36 or at a plurality of positions, such as on both sides of the test pattern 36.

The upper polarizer 23 has a pad facing portion 33b as its end portion projecting more outward than the counter substrate 22. The pad facing portion 33b overlaps the ground pad 32b. In the example illustrated in FIG. 3, of four sides of the upper polarizer 23, only a part of one side located on the same side as the terminal portion 35 of the TFT substrate 21 projects horizontally more than the counter substrate 22 thereby forming the pad facing portion 33b. As for the horizontal positional relationship in FIG. 3, for example, it is preferable that the dimension of projection of the terminal portion 35 be smaller in order to implement a smaller frame. For this purpose, the ground pad 32b and the test pattern 36 are disposed such that the respective positions of the ground pad 32b and the test pattern 36 in the horizontal direction overlap each other. In other words, the ground pad 32b and the test pattern 36 can be disposed aligned in the vertical direction along one edge of the TFT substrate 21, as illustrated in FIG. 3. In such a case as well, forming only the pad facing portion 33b so as to project horizontally, as illustrated in FIG. 3, enables preventing the upper polarizer 23 from projecting above the test pattern 36. As for the horizontal position in FIG. 3, in the case that the ground pad 32b can be disposed with displacement toward the active area AA rather than the test pattern 36, the upper polarizer 23 can be formed such that its one whole edge projects uniformly, as illustrated in FIG. 1 for the first embodiment, to thereby form the pad facing portion 33b.

A structure for connecting the electrically conductive adhesive layer 24 to the ground pad 32b is formed using the pad facing portion 33b, similar to the first embodiment. Specifically, the counter substrate 22 is not present between the ground pad 32b and the pad facing portion 33b, and a gap is formed instead. Further, the electrically conductive adhesive layer 24 is present as an electrically conductive layer on the surface of the pad facing portion 33b, the surface on the side facing the TFT substrate 21. Electrically conductive paste as an electrically conductive member 34b is filled in the gap between the ground pad 32b and the pad facing portion 33b, whereby the electrically conductive adhesive layer 24 is electrically connected to the ground pad 32b with the electrically conductive member 34b.

This embodiment as well can produce an effect of countermeasures against static electricity and also an effect of reducing the dimension of a frame, as described in the first embodiment.

Third Embodiment

The respective liquid crystal display devices 20, 20B in the first and second embodiments each include the electrically conductive adhesive layer 24 as an electrically conductive layer between the counter substrate 22 and the upper polarizer 23. The display panel of a liquid crystal display device 20C according to the third embodiment differs from the respective display panels of the liquid crystal display devices 20, 20B in the first and second embodiments in that the former display panel includes a transparent electrically conductive film 40 between the counter substrate 22 and the electrically conductive adhesive layer 24 so that the electrically conductive layer between the counter substrate 22 and the upper polarizer 23 includes not only the electrically conductive adhesive layer 24 but also the transparent electrically conductive film 40.

Figure 5:
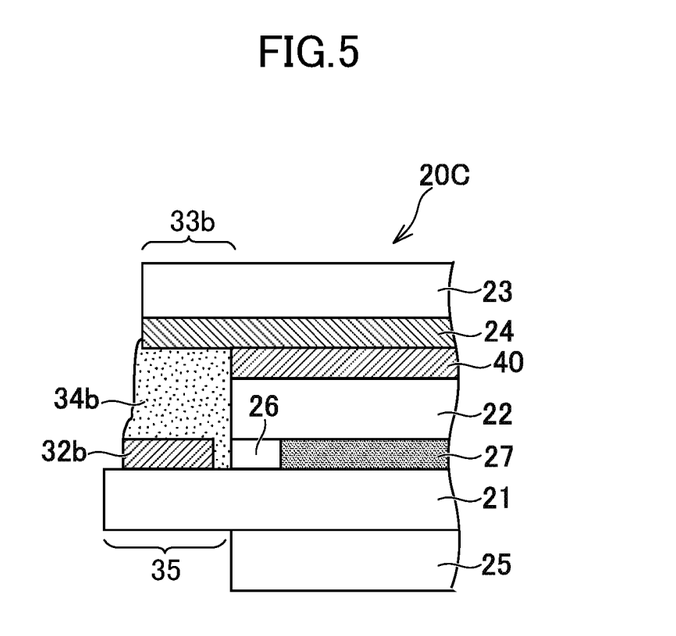
FIG. 5 is a schematic vertical cross-sectional view of a part of a liquid crystal display device according to a third embodiment of the present invention, the part being relevant to a connection structure between an electrically conductive layer formed on the upper surface of the counter substrate and a ground pad formed on the TFT substrate.

FIG. 5 is a schematic vertical cross-sectional view of a part of the liquid crystal display device 20C, the part being relevant to the connection structure between an electrically conductive layer disposed on the upper surface of the counter substrate 22 and the ground pad 32b disposed on the TFT substrate 21. Although the connection structure for the ground pad 32b disposed on the side closer to the terminal portion 35, similar to the second embodiment, is described here, a connection structure having a similar characteristic can be achieved also in the case that the ground pad 32 is disposed on the side closer to the terminal portion 30, similar to the first embodiment.

The electrically conductive adhesive layer 24 is similar to those in the first and second embodiments, and present on the surface of the pad facing portion 33b, the surface on the side facing the TFT substrate 21.

The transparent electrically conductive film 40 is made of, for example, Indium Tin Oxides (ITO) and disposed on the surface of the counter substrate 22, the surface being on the side closer to the upper polarizer 23.

For example, the upper polarizer 23 having the electrically conductive adhesive layer 24 thereon is disposed on the counter substrate 22 with the transparent electrically conductive film 40 thereon such that the upper polarizer 23 is adhered with the electrically conductive adhesive layer 24 onto the transparent electrically conductive film 40 on the counter substrate 22. With the above, the electrically conductive adhesive layer 24 and the transparent electrically conductive film 40 overlap each other, thereby together constituting a single electrically conducive layer. Grounding the electrically conductive layer between the counter substrate 22 and the upper polarizer 23 enables preventing undesired accumulation of charges in the counter substrate 22.

As a structure for grounding the electrically conductive layer including the electrically conductive adhesive layer 24 and the transparent electrically conductive film 40, the pad facing portion 33b is provided to the upper polarizer 23, and electrically conductive paste is filled as the electrically conductive member 34b in the gap between the ground pad 32b and the pad facing portion 33b. The electrically conductive member 34b is in contact with the electrically conductive adhesive layer 24 under the pad facing portion 33b, whereby the electrically conductive layer including the electrically conductive adhesive layer 24 and the transparent electrically conductive film 40 is electrically connected to the ground pad 32b.

Basically, the transparent electrically conductive film 40 is formed on the entire surface of the counter substrate 22 on the side closer to the upper polarizer 23, and the side surface of an end portion of the transparent electrically conductive film 40 is exposed on the side surface of the liquid crystal panel as the side surface of an end portion of the counter substrate 22 is, the side surface facing the gap between the ground pad 32b and the pad facing portion 33b. The electrically conductive member 34b is in contact with the transparent electrically conductive film 40, which is exposed on the side surface. This structure as well enables electrical connection of the electrically conductive layer including the electrically conductive adhesive layer 24 and the transparent electrically conductive film 40 to the ground pad 32b.

In this embodiment, the electrically conductive adhesive layer 24 and the transparent electrically conductive film 40 can be formed such that the combined seat resistance becomes, for example, $1 \times 10^8$ to $1 \times 10^{11} \Omega/\square$.

This embodiment as well can achieve an effect of countermeasures against static electricity and also an effect of reducing the dimension of a frame, as described in the first and second embodiments.

Fourth Embodiment

The display panel of a liquid crystal display device 20D according to a fourth embodiment differs from the respective display panels of the liquid crystal display devices in the first to third embodiments in that the electrically conductive layer between the counter substrate 22 and the upper polarizer 23 of the former display panel does not include the electrically conductive adhesive layer 24, but includes only the transparent electrically conductive film 40 described in the third embodiment.

Figure 6:
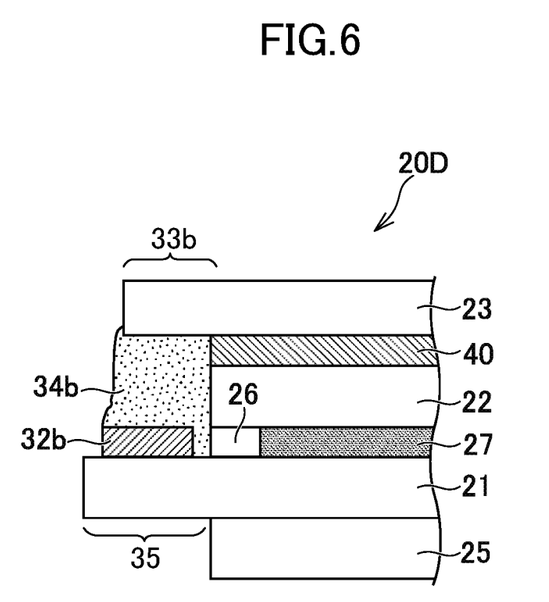
FIG. 6 is a schematic vertical cross-sectional view of a part of a liquid crystal display device according to a fourth embodiment of the present invention, the part being relevant to a connection structure between an electrically conductive layer formed on the upper surface of the counter substrate and a ground pad formed on the TFT substrate.

FIG. 6 is a schematic vertical cross-sectional view of a part of the liquid crystal display device 20D, the part being relevant to a connection structure for the transparent electrically conductive film 40 on the upper surface of the counter substrate 22 and the ground pad 32b on the TFT substrate 21. Although such a connection structure for the ground pad 32b disposed on the side closer to the terminal portion 35, similar to the second embodiment, is described here, a connection structure having a similar characteristic can be achieved also in the case that the ground pad 32 is disposed on the side closer to the terminal portion 30, similar to the first embodiment.

For example, the upper polarizer 23 is disposed on the counter substrate 22 with the transparent electrically conductive film 40 thereon. In the above, for example, the upper polarizer 23 can be adhered onto the transparent electrically conductive film 40 on the counter substrate 22, for example, with non-electrically conductive adhesive agent (not illustrated).

As a structure for grounding the electrically conductive layer including the transparent electrically conductive film 40, the pad facing portion 33b is provided to the upper polarizer 23, and electrically conductive paste as the electrically conductive member 34b is filled in the gap between the ground pad 32b and the pad facing portion 33b. As described in the third embodiment, the side surface of an end portion of the transparent electrically conductive film 40 is exposed on the side surface of the liquid crystal panel as the side surface of an end portion of the counter substrate 22 is, the side surface facing the gap between the ground pad 32b and the pad facing portion 33b. The electrically conductive member 34b is in contact with the transparent electrically conductive film 40 exposed on this side surface, whereby the transparent electrically conductive film 40 is electrically connected to the ground pad 32b to be thereby grounded.

This embodiment as well can achieve an effect of countermeasures against static electricity and also an effect of reducing the dimension of a frame, as described in the first to third embodiments.

In the conventional structure illustrated in FIG. 7, since the electrically conductive paste 12 is present outside the upper polarizer 5, the electrically conductive paste 12 can be raised from the upper surface of the upper polarizer 5. This can cause distortion in placing a cover glass on the upper polarizer 5. On the contrary, according to this embodiment, since the electrically conductive member 34, 34b is present either on the back surface or a part of the side surface of the upper polarizer 23, the upper surface of the upper polarizer 23 can remain flat even where the electrically conductive member 34, 34b is positioned. This structure can reduce a possible of causing distortion to a cover glass to be disposed on the upper polarizer 23.

Note that the present invention is not limited to the above-described embodiments, and various modifications are possible. For example, the structures described in the embodiments can be replaced with a substantially identical structure, a structure producing the same effect, or a structure achieving the same object.

The present invention can be applied to other electro-optical devices, such as organic EL display devices, micro LEDs, or electrophoresis devices, to attain countermeasures against statistic electricity and to implement narrow frames.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device comprising:
a counter substrate, a TFT substrate, a polarizer, an electrically conductive layer, and FPC, wherein
the counter substrate is disposed between the TFT substrate and the polarizer,
the electrically conductive layer is disposed between the counter substrate and the polarizer,
the TFT substrate includes a first terminal portion, a second terminal portion, and a ground pad, the first terminal portion projecting more outward than a first edge of the counter substrate, the second terminal portion projecting more outward than a second edge of the counter substrate, the first edge of the counter substrate being located on an opposite side of the second edge of the counter substrate, the FPC being disposed on the first terminal portion, the ground pad being disposed on the second terminal portion,
the polarizer includes a pad facing portion that overlaps the ground pad at a position more outward than the second edge of the counter substrate, an edge of the pad facing portion being located between the second edge of the counter substrate and an edge of the TFT substrate,
the electrically conductive layer includes a pad facing portion that overlaps the pad facing portion of the polarizer,
the display device further comprises an electrically conductive member, and
the electrically conductive member connects the ground pad and the pad facing portion of the electrically conductive layer.

2. The display device according to claim 1, wherein
the electrically conductive layer is an electrically conductive adhesive layer for adhering the polarizer onto the counter substrate, and
the electrically conductive member is in contact with the electrically conductive adhesive layer on a surface of the pad facing portion of the polarizer.

3. The display device according to claim 2, wherein
the electrically conductive layer further includes a transparent electrically conductive film between the counter substrate and the electrically conductive adhesive layer, and
the electrically conductive member is in contact with the transparent electrically conductive film at a position adjacent to an end portion of the counter substrate.

4. The display device according to claim 1, further comprising a test pattern on the second terminal portion, wherein
the test pattern is a plurality of electrode pads, and the plurality of electrode pads are arranged along the second edge of the counter substrate.

5. The display device according to claim 1, wherein
the ground pad is connected to the FPC by a wire.

* * * * *